United States Patent Office 3,185,580
Patented May 25, 1965

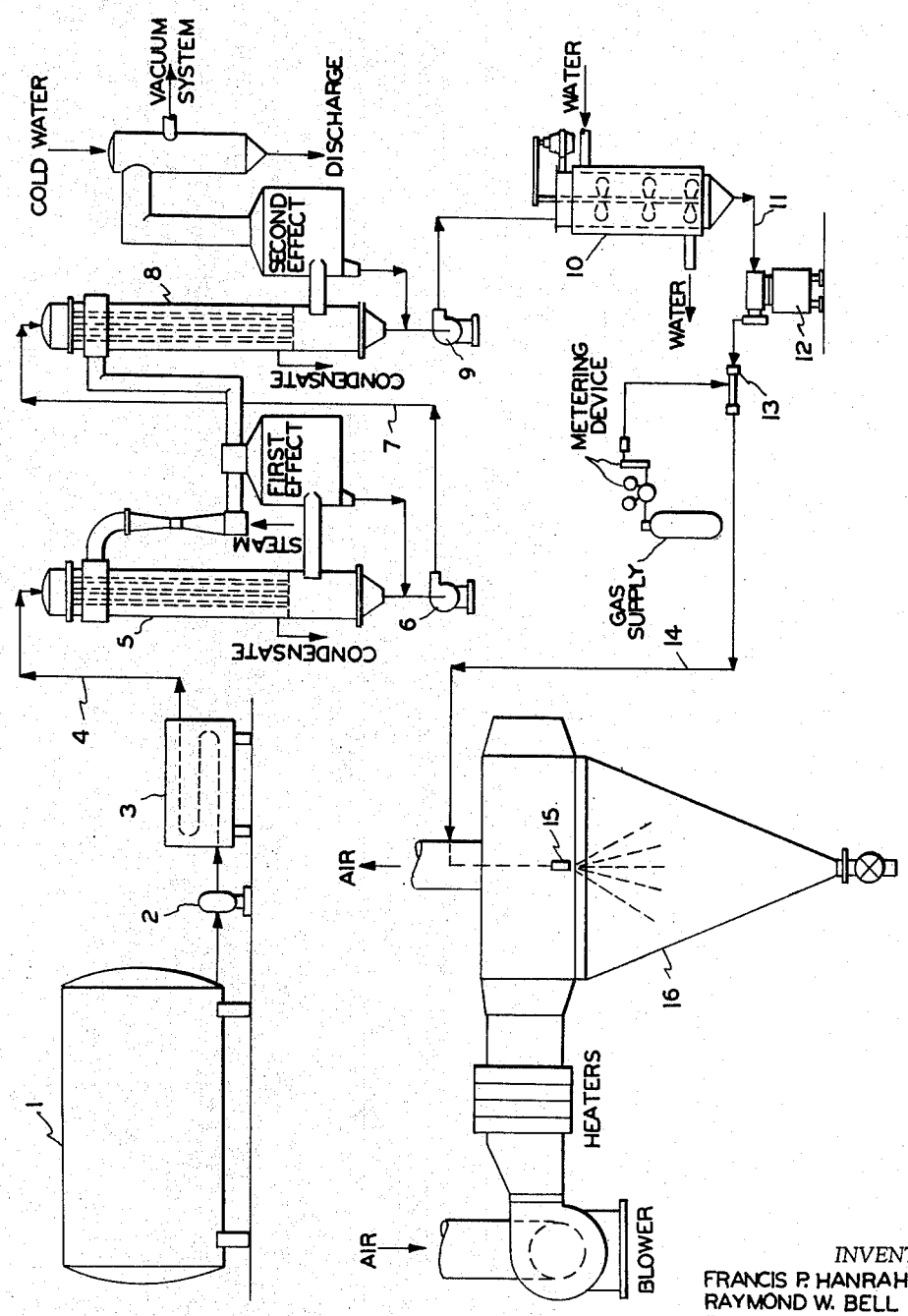

3,185,580
PROCESS FOR MAKING PUFF SPRAY DRIED NONFAT DRY MILK AND RELATED PRODUCTS
Francis P. Hanrahan, Silver Spring, Md., Raymond W. Bell, Washington, D.C., and Byron H. Webb, Harpers Ferry, W. Va., assignors to the United States of America as represented by the Secretary of Agriculture
Filed July 9, 1962, Ser. No. 208,650
6 Claims. (Cl. 99—203)
(Granted under Title 35 U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for converting liquid lacteal materials to a solid state and to the products resuling therefrom. More particularly, this invention relates to a process for manufacturing dry milk products of special physical characteristics in which the pasteurized liquid material is concentrated to a higher solids content than usual and is then spray dried by virtue of the injection of a suitable gas just prior to the drying step. The liquid materials to which this invention relates include whole milk, skim milk, buttermilk, whey, chocolate milk and the like.

Numerous processes have been developed for converting liquids containing lactose, particularly skim milk, to a readily and quickly soluble powder that is relatively nonhygroscopic. In early processes emphasis was placed on methods whereby the product would contain crystalline alpha lactose monohydrate (hereinafter referred to as alpha lactose hydrate) in order to lessen the tendency of the powder to absorb water and to minimize caking and quality deterioration. The spray dried product containing more than 50 percent amorphous anhydrous lactose (approximately 60 parts beta and 40 parts alpha), was rehydrated to a moisture level that would permit the formation of alpha lactose hydrate, the crystalline isomeric form of lactose that is stable at ambient temperatures in contrast to the amorphous solid alpha and beta anhydrides which are highly hygroscopic and unstable. The desired change having been accomplished, the excess moisture, amounting to approximately 5 to 10%, was then removed under what were considered suitable time-temperature conditions.

While conversion of part of the amorphous lactose to the stable alpha lactose hydrate was accomplished, it soon was realized that in so doing there was partial insolubilization of the protein and an accompanying deterioration of the product.

Then followed the development of improved methods in which not only the period of alpha lactose hydrate crystallization was shortened but also the time required to remove the excess moisture and arrive at the 3 or 4% moisture level desired in the commercial product.

A second and highly desirable result, in addition to a lessening of the hygroscopic nature of the powder by means of lactose crystallization, was the formation of aggregates from the fine spray dried nonfat milk particles. As the moisture content of the powder was increased in order to bring about the formation of crystalline alpha lactose hydrate, the particles became sticky and adhered to each other. Upon removing the excess moisture these clumps, or aggregates, remained. Thus, wettability and dispersibility were improved.

This is the instantizing method now most generally used to make so-called "Instant" nonfat dry milk. Concontrated skim milk containing 40 to 45% solids is spray dried, the powder (containing perhaps 4% moisture) is exposed to a hot and humid atmosphere, the particles agglomerate, lactose crystallizes as the alpha lactose hydrate isomer, and the excess moisture is removed with mild heat, all in the course of a few minutes, and the final product is packaged. This is the "Instant" nonfat dry milk of increasing popularity among the buying public.

However, it will be seen that additional steps are required and extra expense is incurred beyond the completion of what is known as the conventional process of making spray dried nonfat milk. Inherent in these steps is the risk of causing partial coagulation and insolubilization of protein.

It is an object of the present invention to provide a process whereby a physically stable, quickly soluble, high quality nonfat dry milk and other dry milk products can be made with conventional type spray driers without further treatment of the powder obtained therefrom.

A further object is to provide a process for producing "Instant" puff spray dried lacteal materials in which a substantial proportion of the lactose component is crystalline alpha lactose hydrate.

A further object of the present invention is to provide means whereby the output of conventional spray driers can be increased substantially at little additional cost for equipment.

It is a further object to provide a process for converting liquid lacteal materials into the desired dry form at less expense than by the procedures presently employed.

Other objects and advantages not specifically enumerated will be apparent from the following description in which the preferred embodiments are described and compared with current practices.

The sole figure of drawing is a diagrammatic flow arrangement of apparatus suitable for carrying out a preferred embodiment of the invention.

Nonfat dry milk may be taken to illustrate the salient features of this invention in producing a stabilized, readily reconstitutable, noncaking product without sacrificing any of its desirable properties. The process is also applicable to the manufacture of dry whole milk, dry buttermilk, and dry whey and other dry lacteal products such as chocolate milk with similar desirable advantages and results.

In general, according to the present invention, a liquid lacteal material is heated at a time-temperature combination sufficient to at least pasteurize it, the heat-treated liquid is concentrated to a solids content up to about 65%, a relatively insoluble, innocuous gas at a pressure in excess of the hydraulic pressure on the concentrate is injected into the concentrate, and the gas-concentrate mixture is immediately spray dried to produce a free-flowing dried milk product, all in a continuous process.

In a preferred embodiment of the present invention the lacteal concentrate at a temperature designed to maintain flowability until spray dried, is seeded with lactose or lactose containing material.

Following the above described evolution of a more stable and readily soluble nonfat dry milk came a clearer understanding of the importance of the size, shape, and structure of the particles and the readiness with which they could be dispersed in water. While crystallization of alpha lactose hydrate takes place during the "instantizing" step outlined above, analyses (method of Sharp, P. F., and Doob, H. J., Dairy Sci. 24, 589 (1941)) of different brands of nonfat dry milk currently being retailed revealed that not more than about 25% of the lactose present was crystalline alpha lactose hydrate. Indeed some contained only about 5% of its lactose in this form.

While crystallization of lactose in spray dried nonfat dry milk in order to satisfy its affinity for water and thus decrease its hydroscopic nature is advantageous and desirable, so, too, is large particle size with accompanying improved wettability and dispersibility.

Although it is well known that it is much more efficient to remove water under a vacuum than in a drying chamber at atmospheric pressure, whole milk and skim milk concentrates that are made for commercial drying contain no more than about 45% solids. As an example, with a vacuum, and using a double effect evaporator with facilities for compressing and utilizing the vapors from the first effect, one pound of steam suffices to vaporize 3 pounds of water, whereas at atmospheric pressure in a drying chamber, 1 pound of steam will vaporize only ⅓ pound of water. This 9 to 1 advantage in favor of evaporating water under a vacuum rather than at atmospheric pressure can be increased by heat utilization methods that are well known in the industry, such as vapor heaters for forewarming milk.

A limitation on the solids level to which milk and its liquid by-products can be concentrated prior to drying is the viscosity of their concentrates. Obviously it must not be so high that the material cannot be moved satisfactorily through the processing equipment. The time element and temperature are important. While condensed skim milk containing 50 to 60% solids may flow freely as it comes from an evaporator, on being held it is liable to become too viscous for further processing.

Another consideration is the fact that, with conventional spray drying equipment, as the solids content of the concentrate is increased above about 45%, it becomes increasingly difficult to produce a powder of satisfactory dryness and particle size. We have used spray nozzles in which the orifice ranged in diameter from 0.040 to 0.050 inches. With an air-drying temperature of 264° F. and an 0.040 inch orifice, no difficulty was experienced in drying a 45% solids content skim milk. The dry particles were small and discrete and contained only 2.4% moisture. But on attempting to dry a 48.9% solids concentrate under the same conditions the powder particles were coarse and lumpy and their moisture content was 5.6%. It was discovered that the injection of a compressed gas into the product en route from the high pressure pump to the atomizer while using an 0.040 inch orifice in the atomizer and 264° F. drying air, enabled us to successfully dry this concentrate. A relatively insoluble gas such as compressed air or nitrogen injected at the rate of 2.0 standard cu. ft. per gallon of concentrate (s.c.f./gal. conc.) enabled us to produce a powder containing 2.0% moisture with no increase and even a decrease in the temperature of the drying air. The pressure of the gas being injected into the product line necessarily exceeded that at the pump, or 1800 p.s.i.g.

In succeeding experiments with conventional drying facilities, increasing the diameter of the orifice of the spray nozzle and/or the solids content of the condensed skim milk resulted in a product of even higher moisture content and larger particle size than in the unsuccessful attempt to dry the 48.9% solids content condensed skim milk. However, and without exception, the injection of compressed nitrogen into the product line on the high pressure side of the pump at the rate of 1 to 3 s.c.f./gal. conc. brought about satisfactory drying even with an .050 inch orifice and 60% solids condensed skim milk. The moisture content of the powder was 2 to 3%, the particles were much larger than those obtained when drying the 45% concentrate without gas injection and they dispersed more readily in water. In apparance under a microscope they were round, white and opaque and resembled puff balls. They varied in diameter from a few to as many as 200 microns with most of them in the 70 to 100 micron range. Some appeared in clusters 200 to 400 microns or larger in their largest dimension. This is in marked contrast to conventionally spray dried nonfat dry milk which is composed mainly of single particles less than 50 microns in size.

Injection of the gas results in a greater expansion of the spray droplets and particles, increases their surface area, lowers their density and facilitates heat transfer and thus increases the effectiveness of the heating medium. Furthermore, the expanded particles remain longer in suspension in the drying air than unexpanded particles.

By making it possible through the injection of a compressed gas to effectively dry a concentrate of higher solids and therefore of lower water content, than heretofore, and by expanding the droplets and particles, the temperature of the drying air can be 10 to 20° F. below that ordinarily employed in the spray drying operation.

An evaporator of the falling film type has been found to be especially suitable for concentrating skim milk to a high solids level. The concentrate, as it is pumped from the evaporator, is free flowing even at 60% or somewhat higher solids content. This high solids product, processed immediately without cooling or heating, was spray dried successfully by injecting gas into it upstream to the spray nozzle as indicated above, thus effecting large economies in steam use and greatly increasing the output of the dryer and at the same time producing an "Instant" nonfat dry milk.

The bulk density of this product is less than that of conventionally spray dried nonfat dry milk made from skim milk of 40 to 45% solids content but essentially the same as that (0.35 to 0.40) of "Instant" nonfat dry milks obtained in the market place, and the same is true of the similarity of dispersibility of the latter and this product even though on being added to a beaker containing water our product does not sink but floats on the surface. Brief stirring or shaking causes the solids of our product to disperse quickly and completely with no sedimentation. In contrast, although ordinary nonfat dry milk floats on the surface of water, on being stirred it forms gummy masses which can be dispersed only by long-continued, vigorous agitation.

Since somewhat more than one-half of the solids of skim milk is lactose, skim milk that has been concentrated to more than 50% solids content contains lactose in excess of its final solubility—in water at 100° F. its solubility is 30 grams per 100 grams of water—but not to an extent sufficient to cause spontaneous crystallization. In general, crystallization can be initiated and greatly accelerated by stirring and seeding a metastable, supersaturated solution, as is well known. Condensed skim milk containing crystalline lactose, or a cold water slurry (equal parts by weight of lactose and water) containing 0.2 to 0.3% and even less of 300 mesh alpha lactose hydrate based on the weight of the concentrate being processed, suffices for seeding. The amount of seeding material depends in part upon the degree of supersaturation—the more supersaturated the less seeding material is needed.

A water solution of lactose in a state of rotational constancy or equilibrium, at 77° F., has 62.25% of its lactose in the beta form and 37.75% in the alpha form. The equilibrium constant, K, is, therefore, 1.65 at this temperature. This constant is only slightly altered within the temperature range 77 to 127° F. Since the tendency is to maintain this equilibrium and because a time factor is involved at all temperatures below 159° F., this must be taken into consideration along with solubility and concentration in arriving at the temperature at which most rapid crystallization can be attained. The rate of crystallization has been studied and it is known to be greater at 86° F. in sweetened condensed milk than at any lower temperature where lactose is, of course, less soluble. (Hunziker, O. F., Condensed Milk and Milk Powder, ed. 7, p. 194, 1949.)

Hunziker also reveals (p. 195) that as the concentration of lactose in the water phase of condensed milk is increased, the temperature at which the maximum rate of crystallization takes place increases. In a solution in which the lactose-in-water percentage is 43, as it is in condensed skim milk of approximately 60% solids content, the optimum temperature for forced crystallization, on the basis of percent lactose in water, is in the neighborhood of 120° F.

Therefore, theoretically, in crystallizing lactose in condensed skim milk—and the same is true of condensed whole milk, buttermilk and whey—best conditons call for maximum solids content, seeding, and crystallization at a temperature that is based on the lactose-in-water concentration. Where the lactose-in-water percentage is 34, as it is in 50% solids skim milk, the theoretical temperature at which to obtain the maximum rate of crystal formation is 96° F. If crystallization in 50 to 55% solids condensed skim milk is carried out for an hour or so under favorable seeding, stirring, and temperature conditions and the concentrate is then puff spray dried without warming, 20 to 30% and even more of the lactose in the dried product will be crystalline alpha hydrate. This is more crystalline alpha lactose hydrate than is to be found in some brands of "Instant" nonfat dry milk. But if the solids content of condensed skim milk is increased to beyond the 50–55 percentage range, and the crystallizing temperature is based on the lactose-in-water concentration, the concentrate is likely to become too viscous during a delaying crystallizing period of this duration. In order to retard the rate of viscosity increase the crystallizing temperature should be substantially lower, for example, 90° F. instead of 115° F., in the case of 57.5% condensed skim milk. Nevertheless, because of the higher lactose-in-water content of 55–60% solids condensed skim milk and even at a lower than theoretically optimum temperature for mass crystallization, examination of its puff spray dried powder shows nearly as high a level of crystalline alpha lactose hydrate after a shorter forced crystallizing period. If a temperature range were to be selected for forced crystallization of lactose in skim milk concentrates in the 45 to 60% solids range, it would be about 75 to 105° F.

Since the percentage of lactose in the solids of whole milk is less than 40 as compared to more than 50 in skim milk, less of the total lactose in condensed whole milk will crystallize as the alpha lactose hydrate than in condensed skim milk of the same solids content as shown by examination of its puff spray dried powder. Partially offsetting this lower lactose content is the fact that whole milk can be condensed to a higher solids level than skim milk without encountering too high viscosity. Consequently, puff spray dried whole milk as well as puff spray dried nonfat milk containing 20% or more crystalline alpha lactose hydrate can be made by our new process.

On the other hand more than 70% of the solids of sweet whey is lactose and, since whey can be condensed to over 60% solids content without developing too high viscosity for forced crystallization, more than 50% of the lactose in its puff spray dried powder may be present in the alpha lactose hydrate form.

What has been said about lactose crystallization and puff spray drying of skim milk likewise applies to sweet cream buttermilk because the composition of the two liquids is nearly the same.

As already indicated, the drawing shows a preferred flow arrangement of equipment for making puffed nonfat dry milk and related dry products according to our invention. The raw liquid is withdrawn from holding tank 1 by means of a positive displacement pump 2 which propels it through a heating unit 3, and is conducted by means of pipe 4 into the top of the first effect of a falling film evaporator 5 where the partially concentrated material is removed by pump 6 which propels it through pipe 7 into the top of the second effect 8 where it is concentrated to the desired solids content and removed by pump 9 which propels the concentrate into the temperature controlled holding tank 10 where it is seeded and slowly stirred for a desired period of time and is fed through pipe 11 into a high pressure positive displacement pump 12 which propels the product into a mixing chamber 13 which allows gas to be metered into the product, and thoroughly mixed while being conducted through pipe 14 to the spray nozzle 15 within the spray type dryer 16.

Examples 1 to 3 illustrate our new process for making a puff spray dried milk product containing crystalline alpha lactose hydrate.

*Example 1*

Skim milk was heated in a suitable heat exchanger to 165° F. and conducted to the distributing head of an evaporator of the falling film type, the time in transit being 15–20 seconds. As the skim milk flowed down the surfaces of the tubes of the tube chest in a uniform film it was further heated by steam under reduced pressure, water evaporated from it and the concentrate containing 25% solids was further concentrated until it contained 52% total solids. This concentrate, as it was pumped out of the liquid-vapor separation chamber to a jacketed crystallizing-surge tank, was at the optimum temperature (100° F.) for obtaining the maximum rate of crystallization of alpha lactose hydrate.

The first portion of the concentrate was puff spray dried without delay and without seeding, using an .043 inch nozzle and 270° F. drying air. Nitrogen at a pressure in slight excess of the hydraulic pressure (1800 p.s.i.g.) was injected into the concentrated fluid line immediately upstream of the nozzle at the rate of 2 standard cubic feet per 1.5 gallons of concentrate. The moisture content of the powder was 3.6%, the bulk density 0.37 and the dispersibility in chilled water was 94.8%. Four percent of the lactose was in the crystalline alpha form.

*Example 2*

The second and immediately following portion of the concentrate prepared in Example 1 was seeded with a cold slurry of 325 mesh lactose at the rate of 100 grams in 100 pounds of concentrate, stirred for 5 to 10 minutes and puff spray dried as above. The moisture content of the powder was 2.8%, the bulk density 0.34, and the dispersibility 94.4%. Eight percent of the lactose component was in the alpha hydrate form.

*Example 3*

A third portion of the concentrate of Example 1 was processed in the same way as the second except that it was stirred 30 to 35 minutes after seeding. The moisture content of the powder was 2.8 percent, the bulk density 0.34 and the dispersibility 91.0%. Twenty percent of the lactose was the alpha hydrate isomer.

The following example is included to show the effects of injecting insufficient gas into a particular concentrate.

*Example 4*

A fourth and final portion of the concentrate of Examples 1 to 3 was dried under the same conditions as the three preceding portions except that nitrogen was injected into the product line at the rate of 1.5 standard cubic feet per 1.5 gallons of concentrate instead of 2 s.c.f./1.5 gal. of concentrate. The resulting powder was coarse and formed clumps due to excess moisture. It contained 5.2 percent moisture, had a bulk density of 0.40 and a dispersibility of 93.4 percent.

The viscosity of samples of this concentrate that were held in a quiescent state at room temperature increased from 350 to 1500 centipoises in the course of an hour and while cooling to 80° F.

In other similar experiments in which forced crystallization was continued for an hour instead of 30 minutes and the 50 to 55% solids condensed skim milk was then puff spray dried, the resulting powder contained 30–35 percent of its lactose in the crystalline alpha hydrate form.

Example 5

A skim milk concentrate was prepared as in Example 1 except that it contained 60% solids. This high solids concentrate was spray dried as in Example 1 except that a 0.050 inch nozzle was employed. A highly satisfactory, free-flowing highly dispersible powder of large particle size, and containing less than 3% moisture, was obtained.

We do not wish to be restricted to any particular heat treatment of the skim milk or other lacteal fluids. It may be that required for pasteurization (161° F. for 15 seconds) or for sterilization (285° F. for 15 seconds) or it may be any heat treatment of intermediate severity.

An evaporator of the falling film type is preferred because it will concentrate to a maximum degree with minimum viscosity development. However, any other type or combination of types may be employed provided it will accomplish the desired result.

Furthermore it may be advantageous to have two jacketed stirrer-equipped crystallizing-surge tanks 10 instead of one, in order to clean one while the other is being used and to avoid too long build up of viscosity.

The example that has been given for skim milk applies to whole milk, buttermilk and whey (sweet and sour) except as to details which have already been noted or will be obvious to those who are familiar with the characteristics of these products and are skilled in the drying art.

We do not wish to be limited to the above technique for forming crystalline lactose in these lacteal materials. What has been said is by way of illustration. Other seeding techniques, such as the use of puff spray dried non-hygroscopic whey and other equipment may be used to achieve the desired objective, namely, maximum crystallization of alpha lactose hydrate under practical conditions such as time and economy of operation and the viscosity of each product. Nor do we wish to be limited to a particular crystallizing temperature range. This step may be carried out at any temperature between 75 and 105° F., but preferably within the range 80 to 100° F.

The only limitation on the solids content of such concentrate is that the liquid must be capable of being pumped to the atomizer in the drying chamber. We have successfully dried concentrates having a viscosity as high as 50,000 to 75,000 centipoises. The range of solids, therefore, should extend to above 60%, especially in the case of condensed whey.

Nor do we wish to be limited to the use of any one gas as an aid to puff drying concentrates of milk, skim milk, buttermilk, and whey and other liquid lacteal products. Gases such as nitrogen and air and mixtures thereof are equally effective. Where quality deterioration is relatively unimportant, as it might be in making dry whey and nonfat dry milk for feed, the least expensive and/or most conveniently available gas will suffice.

Nor do we wish to be limited in the volume of compressed gas used per unit of liquid to be dried. Only that volume need be used which suffices to achieve the desired result, namely, satisfactory drying of the concentrated product, including particle size, bulk density and dispersibility as well as moisture content.

Nor do we wish to be limited to the production of dry lacteal products which contain not less than a certain percentage of lactose in the crystalline alpha hydrate form. Even without seeding and forced crystallization, as described in the example of our new process, an appreciable amount of crystalline alpha lactose hydrate may be in the puff spray dried powder. The primary merit of our invention is that it discloses a useful and more economical process for drying lacteal concentrates of higher than usual milk solids content to yield readily dispersible products. Rather than seed and crystallize, a manufacturer may prefer to hold the time between the evaporator 8 and the spray drier 16, and therefore the viscosity increase, to a minimum in order to concentrate to and to dry at as high a solids level as possible.

We claim:

1. A process for making nonfat dry milk comprising sequentially heating skim milk to a temperature and for a time at least sufficient to pasteurize, concentrating the pasteurized liquid up to about 60 percent total solids, tempering, seeding and stirring the concentrate under conditions favorable to lactose crystallization while maintaining the flowability thereof, then forcing the concentrate under a first pressure into a mixing zone, injecting an innocuous, relatively insoluble compressed gas at a pressure in excess of said first pressure into the concentrate in the mixing zone to produce in said mixing zone a gas-concentrate mixture in which the gas is uniformly dispersed, and spray drying immediately following the injection of said innocuous, relatively insoluble, compressed gas thereby producing a physically stable, and readily soluble nonfat dry milk.

2. A process of manufacturing relatively nonhygroscopic puffed milk particles in powdered form from whole milk comprising sequentially heating the milk to a temperature and for a time sufficient to at least pasteurize it, quickly concentrating up to about 65% solids content and under conditions designed to yield a concentrate of maximum fluidity relative to the solids content, seeding, stirring and crystallizing lactose in excess of saturation while retaining the flowability of the seeded concentrate thereof, then forcing the concentrate under a first pressure into a mixing zone, injecting an innocuous, relatively insoluble, compressed gas at a pressure in excess of said first pressure into the concentrate in the mixing zone to produce in said mixing zone a gas-concentrate mixture in which the gas is uniformly dispersed, and immediately thereafter spray-drying said concentrate.

3. A process for making dry buttermilk comprising sequentially heating buttermilk to a temperature and for a time at least sufficient to pasteurize, concentrating the pasteurized liquid up to about 60% solids under conditions designed to yield a concentrate of maximum solids content consistent with further processing, tempering, seeding, stirring and crystallizing lactose in excess of saturation while retaining the flowability of the concentrate, then forcing the concentrate under a first pressure into a mixing zone, injecting an innocuous, relatively insoluble, compressed gas at a pressure in excess of said first pressure into the concentrate in the mixing zone to produce in said mixing zone a gas-concentrate mixture in which the gas is uniformly dispersed, and immediately thereafter spray drying said concentrate.

4. A process of manufacturing relatively nonhygroscopic puffed dry whey of ready solubility and excellent flow properties comprising sequentially heating a whey selected from the group consisting of sweet whey and sour whey to a temperature and for a time sufficient to at least pasteurize, quickly concentrating, tempering, seeding, and stirring and crystallizing lactose while retaining the flowability of the concentrate, then forcing the concentrate under a first pressure into a mixing zone, injecting an innocuous, relatively insoluble, compressed gas at a pressure in excess of said first pressure into the concentrate in the mixing zone to produce in said mixing zone a gas-concentrate mixture in which the gas is uniformly dispersed, and then spray-drying the gas-concentrate mixture.

5. A process of manufacturing readily dispersible dried puffed milk products in powdered form from liquid lacteal material, comprising sequentially heating a liquid lacteal material to a temperature and for a time sufficient to at least pasteurize, concentrating up to as high a solids content as possible while maintaining the flowabiliy thereof, then forcing the concentrated material under a first pressure into a mixing zone, injecting an innocuous, relatively insoluble, compressed gas at a pressure in excess of said first pressure into the concentrated material in the mixing zone to produce in said mixing zone a gas-concentrate mixture in which the gas is uniformly dispersed, and then spray-drying the gas-concentrate mixture.

6. A process for drying a lacteal fluid comprising concentrating a lacteal fluid to a solids content of up to about 65%, seeding the concentrated lacteal fluid at a temperature in the range of about 75° to 105° F. with crystalline lactose, stirring the seeded concentrate, while maintaining the flowability of the concentrate, then forcing the seeded concentrate under a first pressure into a mixing zone, injecting an innocuous, relatively insoluble gas at a pressure in excess of said first pressure into the concentrate in the mixing zone to produce in the mixing zone a gas-concentrate mixture in which the gas is uniformly dispersed, conducting the gas-concentrate mixture to a spray drying zone, and spray drying the gas-concentrate mixture to produce a dry, free-flowing powder.

References Cited by the Examiner
UNITED STATES PATENTS

| | | | |
|---|---|---|---|
| 1,406,381 | 2/22 | Heath et al. | 99—203 |
| 2,728,678 | 12/55 | Sharp | 99—203 X |
| 2,964,407 | 12/60 | Sinnamon et al. | 99—56 |
| 2,970,057 | 1/61 | Terrett et al. | 99—56 |
| 3,072,486 | 1/63 | Oakes et al. | 99—56 |

A. LOUIS MONACELL, *Primary Examiner.*

ABRAHAM H. WINKELSTEIN, *Examiner.*